United States Patent [19]

Langley

[11] Patent Number: 5,240,609

[45] Date of Patent: Aug. 31, 1993

[54] SLUDGE FILTERING DEVICE AND GRID SYSTEM

[75] Inventor: Tony L. Langley, Austin, Tex.

[73] Assignee: Enviroquip, Inc., Austin, Tex.

[21] Appl. No.: 786,110

[22] Filed: Nov. 4, 1991

[51] Int. Cl.⁵ .............................................. B01D 33/80
[52] U.S. Cl. ...................... 210/386; 210/396;
    210/400; 210/541; 15/256.5; 198/497
[58] Field of Search ............... 210/386, 396, 400, 401,
    210/413, 541; 428/120, 122; 277/181, 182, 184,
    189, DIG. 7; 15/245, 256.5, 250.36; 198/497

[56] References Cited

U.S. PATENT DOCUMENTS

| | | | |
|---|---|---|---|
| 2,261,475 | 11/1941 | Kautenberg | 15/245 |
| 3,537,584 | 11/1970 | MacDonald et al. | 210/400 |
| 3,611,841 | 10/1971 | Froden et al. | 15/256.5 |
| 3,951,809 | 4/1976 | Kollmar | 210/400 |
| 3,984,329 | 10/1976 | Wenzel et al. | 210/396 |
| 4,107,812 | 8/1978 | Lantto | 15/250.36 |
| 4,202,437 | 5/1980 | Gordon | 15/256.5 |
| 4,336,624 | 6/1982 | Pichelmann et al. | 15/245 |
| 4,404,099 | 9/1983 | Austin | 210/396 |
| 4,696,383 | 9/1987 | Stoll | 198/497 |
| 4,953,689 | 9/1990 | Peterson et al. | 198/497 |
| 5,041,222 | 8/1991 | O'Dell | 210/400 |

OTHER PUBLICATIONS

Efson, Inc. Advertisement "Efson Guide Rails" 1989.

*Primary Examiner*—Christopher Upton
*Attorney, Agent, or Firm*—Arnold, White & Durkee

[57] ABSTRACT

A device for extracting liquid from sludge which uses a perforate conveyor belt to carry the sludge through the device. A portion of the belt carrying the sludge is supported by a grid support system which includes a series of wear support members. These wear support members each have a rigid body member having an insert wear strip slidably mounted on the rigid body member which can easily be removed from the device without disconnecting the body member from the device.

11 Claims, 3 Drawing Sheets

SLUDGE FILTERING DEVICE AND GRID SYSTEM

BACKGROUND OF THE INVENTION

I. Field of the Invention

The present invention relates generally to devices for separating the liquid component from suspensions such as, for example, slurries or sludge, and more particularly to a belt support grid system for use in sludge filtering devices in which the sludge is carried by a moving perforate conveyor belt whereby the liquid is caused to pass through the conveyor belt and be removed from the slurry.

II. Description of the Prior Art

Continuously operating belt filter presses as such are known in the prior art. Such prior art presses have typically been used for filtering suspensions containing high liquid percentages such as industrial slurries of various types or treated sewage sludge. Such prior art presses typically have an endless filter web or conveyor belt which serves to filter and separate the liquid from the sludge-like material. After the material is initially deposited on a substantially horizontal section of the conveyor belt, a portion of the liquid may be removed by the effects of gravity, with the liquid passing through the perforate conveyor belt as the material is carried by the machine. Some prior art presses include a second conveyor belt which cooperates with the first belt by approaching the first belt at an acute angle so as to define between the two belts a converging area where the sludge material carried by the first belt is retained between the belts and compressed as the two belts are brought together as they move in the same direction.

One such prior art device is disclosed in U.S. Pat. No. 3,951,809 to Kolimar, the device including a pair of endless filter belts which carries the sludge between the belts and through a series of rollers where the liquid is extracted.

Another prior art device is disclosed in U.S. Pat. No. 3,984,329 to Wanzel, where a portion of a sludge filtering device is shown. This device includes a conveyor belt having an initial horizontal portion which carries the sludge away from an entrance point. This portion of the belt is supported by a guide table which is pervious to liquid and permits liquid to pass downwardly through the belt and be discharged below. In this device the guide table includes a series of longitudinal grooves and rows of vertical passages which allows the liquid to flow from the guide table. However, during operation, the liquid often adheres to the underneath side of the conveyor belt, especially where a portion of the belt is substantially horizontal. If this adhering liquid is not removed, it tends to decrease the flow rate of the liquid through the belt. Accordingly, it has been found that efficiency of such liquid extracting devices can be increased if the liquid adhering to the underneath side of the conveyor belt is removed by transverse wear strips or bars. Such wear strips also may serve to support the belt carrying the sludge while allowing the liquid to drain through the belt.

An example of such strips can be seen in U.S. Pat. No. 4,404,099 to Austin. This device discloses an endless band of mesh material extending horizontally between a pair of rollers. This horizontal run portion is supported by a plurality of transversely extending spaced parallel bars which would appear to provide some support as well as guiding the conveyor belt.

Other prior art devices have included individual wear strips or bars to support the underneath side of the conveyor belt. However, such bars have typically been of unitary construction and attached to the device by tightly fitting these bars into slots or other channels formed in the device and held securely in place. After a period of operation, such wear strips or bars become worn due to the conveyor belt constantly riding on the upper surface of each bar. As a result of such severe wear, it is necessary that such bars be frequently replaced. Such replacement has heretofore been quite labor intensive and time consuming. To replace such prior art bars, it was necessary to stop operation of the press for a substantial period of time, remove a major portion of the device in order to gain access to the bars then and remove each entire bar individually. Such removal and replacement required a substantial amount of time and labor in an environment which typically made such work quite unpleasant.

As a result of the shortcomings of the prior art, typified by the above, there has developed and continues to exist a substantial need for a filtering device which includes a support system for the conveyor belt which can be quickly and easily replaced or repaired without substantial labor and expense or without the need for the device to be shut down for long periods of time to replace the support system. Despite this need, and the efforts of others, a filtering device having such a support system has heretofore been unavailable.

SUMMARY OF THE INVENTION

It is therefor a feature of the present invention to construct a filtering device which includes a grid support system that can quickly and easily be replaced when worn. Another feature of the present invention is to construct a filtering device having a series of wear supports or bars which can be easily replaced when worn in a very short period of time without major disassembly of the device Still another feature of the present invention is to construct a wear support or bar which can be installed in a filtering device to assist liquid removal by the device yet the support can be easily replaced when worn without substantial downtime of the device.

The present invention is summarized in that a device for removing liquid from sludge or like material includes an endless perforate conveyor belt for carrying the sludge and extracting liquid from the material through the belt, and a grid support system contacting the underneath side of the conveyor belt to remove adhering liquid. The grid support system has a frame and a plurality of wear support members or bars, each bar having a rigid body member and a replaceable wear strip releasably mounted to each rigid body which can be removed from the device without disconnecting the rigid body from the grid frame.

DESCRIPTION OF THE PREFERRED EMBODIMENTS

Figure 1:
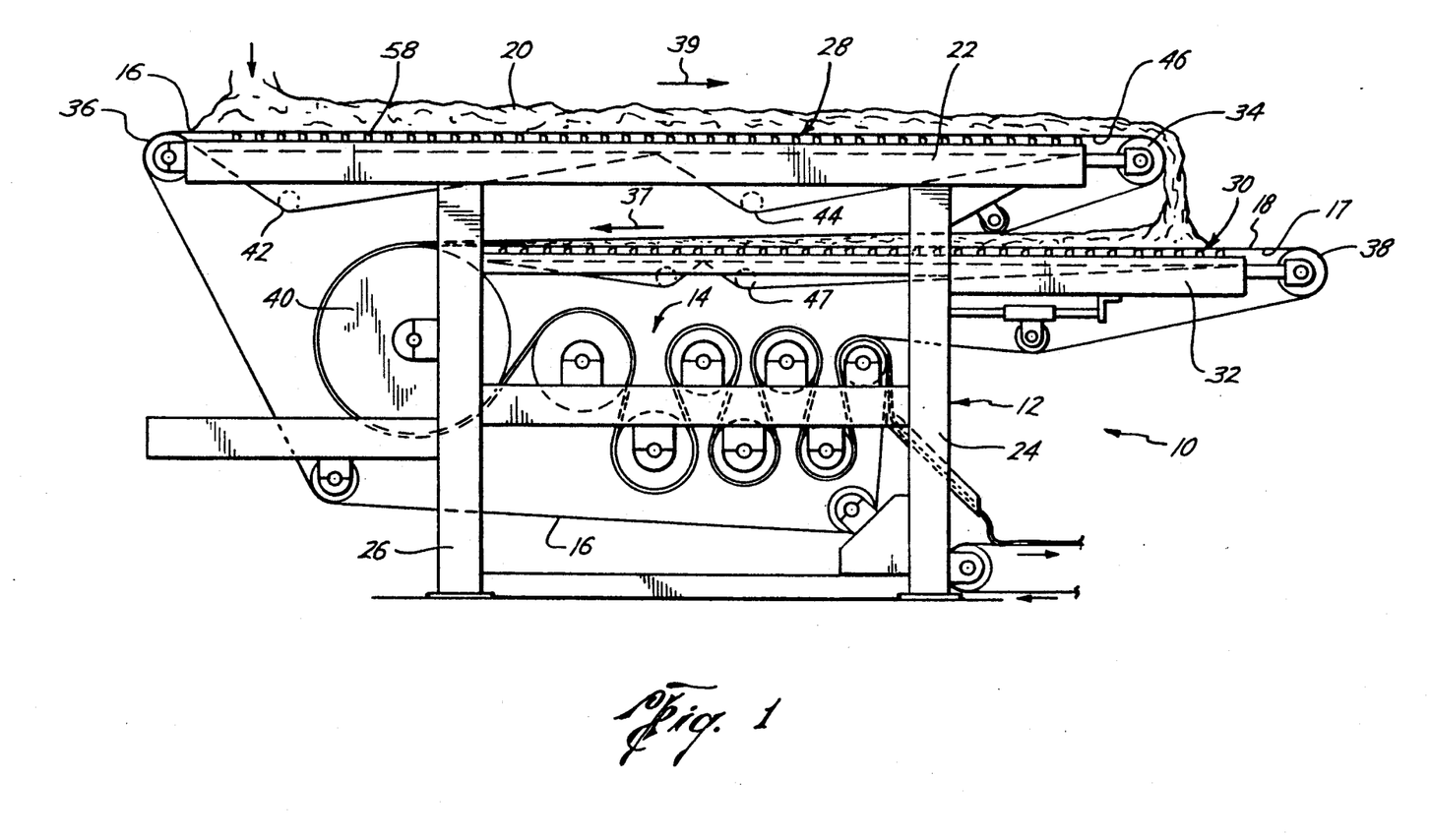
FIG. 1 is a simplified elevational view of a filtering device embodying the invention

Referring first to FIG. 1, a preferred embodiment of a liquid extraction device such as a filter press device in accordance with the present invention is shown generally at 10. Device 10 includes a multistructural frame 12 with a system 14 of drums and rollers axially mounted to frame 12. The device 10 also includes a first endless perforate conveyor belt 16 which includes a portion that runs between a pair of conveyor guide rolls 34, 36, in a substantially horizontal run. First conveyor belt 16 normally travels in the direction indicated by arrow 39 in FIG. 1 and precedes over conveyor guide roll 34 downwardly into roller system 14 (see FIG. 1.)

The device 10 may further include a second endless perforate conveyor belt 18 which also has a substantially horizontal conveyor run portion as shown in FIG. 1. First and second conveyor belts 16, 18 are positioned such that they travel in the same direction as shown by arrow 37 as belt 16 proceeds downwardly and are aligned such that a filtering space is formed between the two oppositely positioned belts 16, 18 as a result of an acute angle formed between them as they each approach roller system 14.

As can be seen from FIG. 1, sludge 20 is deposited on the upper surface of first conveyor 16 from an external source (not shown) and conveyed in the direction designated by the arrow 39. The sludge 20 is conveyed over roller 34 and deposited onto second conveyor belt 18 as shown in FIG. 1. Sludge 20 is then conveyed in the direction designated by arrow 37 into the filtering area formed between the converging first and second conveyor belts 16, 18. As is understood in the industry, as conveyor belts 16, 18 converge, with sludge material 20 deposited between, such sludge 20 is compressed as the conveyor belts 16, 18 converge together and pass around drum 40 of roller system 14 thereby squeezing liquid from sludge 20 and through belts 16, 18. The pair of conveyor belts 16, 18 then proceeds around drum 40 and through the remaining rollers of roller system 14. Roller system 14 consists of decreasing sized rollers such that as the conveyor belts proceed through the roller system, additional liquid is extracted from the sludge material 20. At the conclusion of roller system 14, first conveyor belt 16 is diverted downwardly as shown in FIG. 1 and separated from second conveyor belt 18 with the compressed sludge or cake being separated from the belts 16, 18 and deposited in an appropriate manner for further processing or disposal.

As shown in FIG. 1, frame 12 includes conveyor rails 22 connected to frame legs 24, 26. Also connected to legs 24, 26 are lower rails 32. In the embodiment illustrated in FIG. 1, a first grid support system 28 is shown attached to conveyor rails 22 and supporting the horizontal run portion of first conveyor belt 16. A second grid support system 30 is also shown in the embodiment of FIG. 1 attached to lower rails 32 and supporting the horizontal run portion of second conveyor 18. As can be understood by one skilled in the art, filter device 10 may further include a series of liquid collection devices such as collection pans 42, 44 attached to frame 12 immediately below the horizontal run portion of the first conveyor belt 16. Such collection pans 42, 44 are positioned such that liquid passing through conveyor belt 16 during its horizontal run portion passes through first grid support system 28 and into collection pans 42, 44 for collection and proper disposal.

As can be understood, as sludge 20 passes over first grid support system 28 with liquid being extracted from the sludge 20 by the effects of gravity, liquid passes through perforate conveyor belt 16 oftentimes adheres to the underneath surface 46 of the first conveyor belt 16. As the conveyor belt 16 passes over and is supported by first grid support system 28, such liquid adhering to the underneath surface 46 is removed by first grid support system 28 since the support system 28 contacts the underneath surface 46 of belt 16 and wipes such fluid from surface 46. In addition to this removal effect, first grid support system 28 further supports the horizontal run portion of first conveyor belt 16 as it passes from roller 36 to roller 34. For the purposes of this disclosure, the term "underneath surface" refers to the surface of a conveyor belt opposed from that surface which directly contacts the sludge material. While it typically refers to the surface opposed from the surface of a horizontal belt which carries the sludge, it is meant to include the opposed surface even when the conveyor belt is not substantially horizontal.

Referring again to FIG. 1, second grid support system 30 is shown attached to lower rails 32 and positioned between second conveyor belt 18 and lower rails 32 similar to the positioning of first grid support system 28 on rails 22. As can be seen, second grid support system 30 supports the horizontal run portion of second conveyor belt 18 as it passes from roller 38 to drum 40 which contacts the underneath surface 17 of second conveyor belt 18. As previously described, sludge 20, supported by conveyor 18, has been deposited from conveyor 16 and continues to contain a large amount of liquid which, as a result of the gravity effect, passes through second conveyor belt 18 into collection pans 47 for proper disposal.

Figure 2:
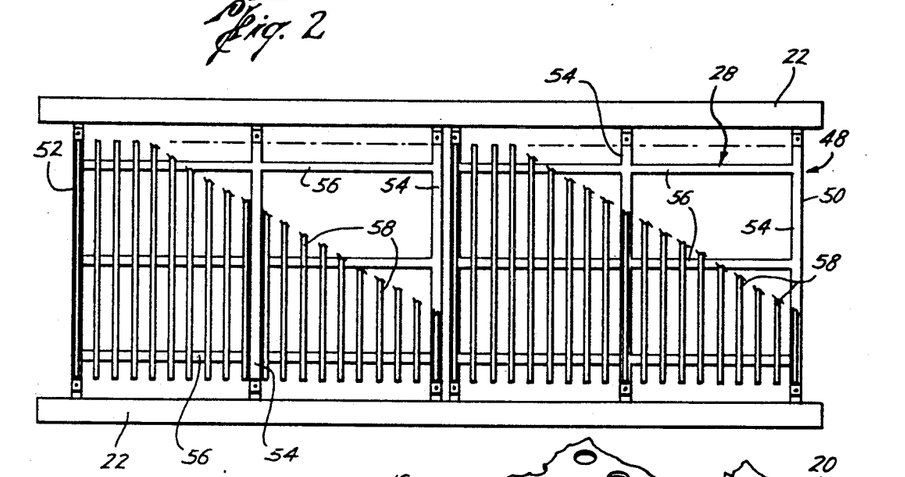
FIG. 2 is a simplified plan view of a grid support system of the present invention.

FIG. 2 illustrates the details of a grid support system, such as first grid support system 28. As shown in FIG. 2, grid support system 28 may include one or more sections which are connected between conveyor rails 22 such that they support and contact the underneath surface 46 of conveyor belt 16 or 18.

Referring to FIG. 2 and specifically grid support system 28 which is positioned so as to contact the underneath side of the conveyor belt 16 during operation, the grid support system 28 includes a grid frame 48 which may be assembled in multiple sections such as first section 50 and second section 52. Grid section 50 may include a series of transversely extending frame ribs 54 which are connected at their ends to rails 22. Grid section 50 may further include several longitudinally extending frame rails 56 which are interconnected with ribs 54 to create a rigid support structure which forms the grid frame 48.

Referring again to FIG. 2, grid support system 28 also includes a plurality of longitudinally spaced wear support members or bars 58 that are attached, parallel to each other, to rails 56 across the grid frame 48 and extend transversely to the width of the conveyor belt 16 between rails 22. As can be seen in FIGS. 1 and 2, wear support members 58 are positioned on grid frame 48 such that the members 58 provide a conveyor bed or path with members 58 contacting belt surface 46 such that the liquid adhering to the underneath surface 46 of belt 16 is removed as the belt 16 slides across the upper surface of member 58 as the belt 16 travels from roller 36 to roller 34.

Where support members 58 are attached directly to frame rails 56 and frame ribs 54 of sections 50, 52 as shown in FIG. 2, each grid frame section 50, 52 may be easily removed or installed by simply connecting a portion of the ends of frame ribs 54 to rails 22, as will be further explained, to allow removal or installation as a single unit.

Figure 3:
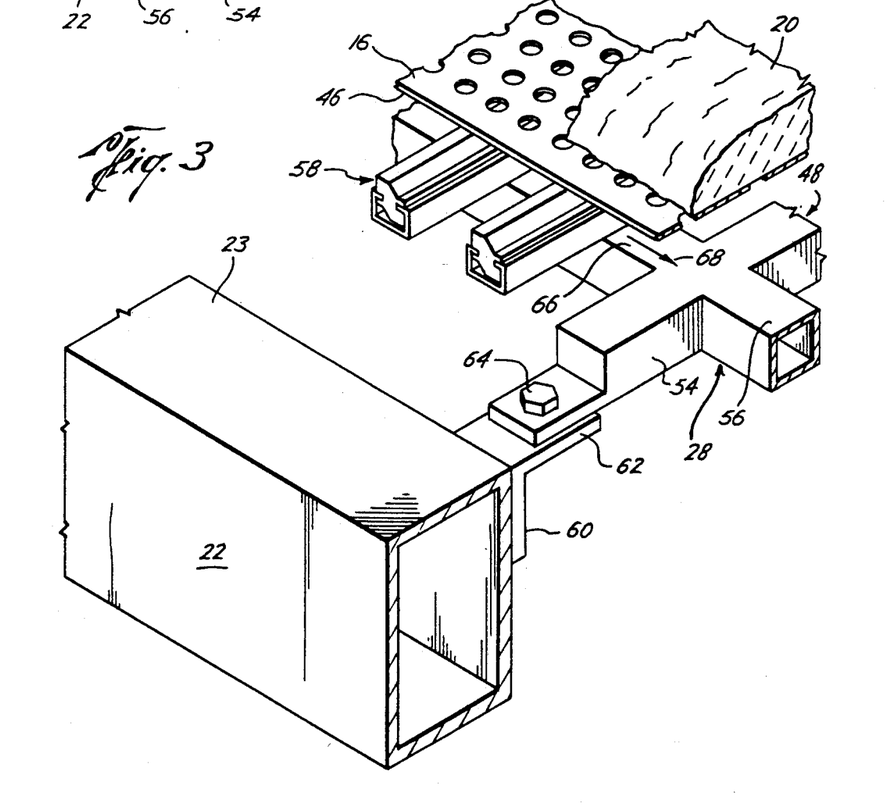
FIG. 3 is a perspective view of a portion of the grid system as it is connected to the conveyor rail of the device frame of the present invention.

Referring now to FIG. 3, an enlarged perspective view of grid system 28 is shown as it is attached to rail 22. Specifically, grid system 28 is shown having grid frame 48 constructed of frame ribs 54 and frame rails 56 interconnected to form a supporting grid segment or section 50 which can be connected to rail 22 as shown in FIG. 2. As can be understood, grid frame 48 may be attached to rail 22 by any suitable attachment means. In the embodiment shown in FIG. 3, such attachment means is shown as rail bracket 60 connected to one surface of rail 22 with the adjacent end of frame rib 54 attached to the upper surface 62 of rail bracket 60 as shown in FIG. 3. Again, any conventional attachment means may be utilized to connect rail 54 to bracket 60, but the embodiment shown in FIG. 3 calls for frame rail 54 to be attached to rail bracket 60 by means of bolt and nut assembly 64.

Referring back to FIG. 3 and the embodiment shown therein, wear support member or bar 58 is shown attached to frame rail 56 and, in particular, to upper surface 66 of rail 56 and extends transversely to the width of belt 16 across the grid frame 48 and extends out past the opposite edge of the belt 16. As can be seen from FIG. 3, wear support 58 is positioned on upper surface 66 of rail 56 such that it is interposed between conveyor belt 16 and grid support frame 48. During operation, the underneath surface 46 of conveyor belt 16 is supported by and slides across wear supports 58, which will be subsequently described in more detail. Accordingly, as belt 16 travels in the direction designated by arrow 68 in FIG. 3, liquid passing through belt 16 from sludge 20 either drops through belt 16 and collects in collection pans 42, 44 or adheres to surface 46. As surface 46 slides across wear support 58, liquid adhering to surface 46 is "wiped" or removed as a result of surface 46 contacting wear support 58. As a result of such contact, liquid is removed and flows downwardly past wear support 58 into collection pans 42, 44.

As can be understood from FIG. 3, the embodiment shown therein utilizes grid frame 48 to position and retain wear support 58 in their proper position. However, as one skilled in the art can recognize, wear support 58 may be attached directly to rail 22 without the need of grid frame 48. For example, wear support 58 may be attached directly to surface 62 of rail bracket 60, thereby eliminating the need for grid frame 48. However, Applicant has determined that additional support is quite often necessary, and such support is provided by grid frame 48. In either embodiment, as can be understood, it is preferred that wear support 58 are positioned above the upper surface 23 of rail 22 such that the operator may access the end of wear support 58 for servicing and removal as will be further explained.

As can be understood, the embodiment shown in FIG. 3, and in particular, grid frame 48 and wear support 58, may be used to construct the second grid support system 30 which is attached to lower rails 32 as shown in FIG. 1. Moreover, such systems may be utilized in other portions of the conveyor belt system, such that wear supports 58 are positioned so as to contact one surface of belt 16 or 18 in order that liquid may be removed from such a belt surface.

Figure 4:
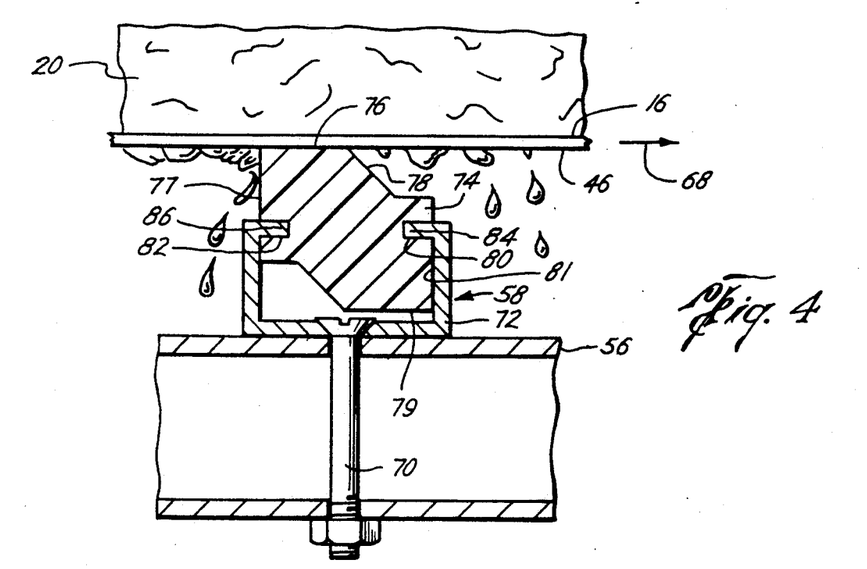
FIG. 4 is a partial cross sectional view of a wear support member attached to the grid frame with the member contacting the conveyor belt of the present invention.

Referring now to FIG. 4, a detailed cross sectional view is shown of wear support member or bar 58 connected to frame rail 56 and its contact with conveyor belt 16. In particular, wear support 58 is shown connected by attachment means as for example nut and bolt assembly 70, to frame rail 56.

In the embodiment shown in FIG. 4, wear support 58 includes a rigid body member 72 connected to grid rail 56 by means of bolt assembly 70. As can be appreciated by one skilled in the art, connection of rigid body member 72 to frame rail 56 may be any conventional means of attachment such as screws or welding. Wear support member 58 may further include an insert wear strip 74 which is releasably mounted to the rigid body member 72 and adapted to be easily removed from the grid support system 48 without disconnecting rigid body member 72 from grid frame 48 and rail 56.

FIG. 4 illustrates one embodiment of an insert wear strip and rigid body member in which the insert wear strip 74 is slidably mounted to rigid body member 72. The embodiment shown in FIG. 4 illustrates an insert wear strip 74 which includes a top surface section for contacting surface 46 of belt 16. The top surface section, in the embodiment FIG. 4 includes top surface 76 which contacts belt surface 46 during operation. The top surface section may further include front surface 77 which, together with top surface 76, forms an edge along the length of strip 74 which removes water adhering to belt surface 46 as belt 16 travels in the direction shown by arrow 68.

Insert wear strip 74 may further include trailing surface 78 which is adjacent to the top surface section and, in particular, top surface 76. Trailing surface 78, in the embodiment shown in FIG. 4, is an inclined surface, and is inclined away from or outwardly from belt surface 46 as shown in FIG. 4. Applicant believes that such a trailing surface, if positioned as in FIG. 4, assists in the removal of liquid from sludge 22 in that, as the perforate conveyor 16 rides across top surface 76 and over trailing surface 78, a slight decrease in pressure is created in the space between trailing surface 78 and belt surface 46 such that additional liquid is actually drawn or pulled through conveyor belt 16 thereby assisting the effect of gravity and increasing liquid removal from sludge 20.

As shown in the embodiment of FIG. 4, insert wear strip 74 may be provided with a pair of transverse slots 80, 82 which extend longitudinally the length of insert strip 74 and are sized such as to be slidably mounted onto rigid body member 72. In order to receive and retain wear strip 74, rigid body member 72 may be an open channel member which includes a tab member adapted for slidably receiving the insert wear strip 74. In the embodiment shown in FIG. 4, the tab member comprises a pair of opposing tabs 84, 86 which extend longitudinally along the length of rigid body 72 and are sized such as to frictionally fit within slots 80, 82 when insert wear strip 74 is slidably mounted on rigid body 72 by sliding wear strip 74 longitudinally from the open end of rigid body 72 until wear strip 74 is fully positioned and slidably received by rigid body 72 and retained in position as a result of tab members 84, 86 being positioned within slots 80, 82.

Referring again to the embodiment shown in FIG. 4, insert wear strip 74 is shown as having two top surface sections with one such section being opposed from the other top surface section and separated by tabs 84, 86 and slots 80, 82. As can be understood from examination of FIG. 4, such an embodiment provides that insert wear strip 74 have two top surfaces 76, 79 such that after a substantial period of operation, surface 76 and front surface 77 become so worn that the initial top surface section is no longer effective in removing water from sludge 20. When such excess wear has occurred, insert wear strip 74 is simply slidably removed from rigid body 72 and reversed by rotating the wear strip 74 by 180° such that the second top surface section which previously had been enclosed within rigid body 72 is positioned oppositely from its prior position so that it now extends above tabs 84, 86 and its top surface 79 is positioned so as to contact surface 46 and remove liquid as previously discussed. As seen in FIG. 4, upon rotation of strip 74 by 180° about its longitudinal axis and insertion of the strip 74 back into rigid body member 72, top surface 76 and front surface 77 are now enclosed within member 72 with surfaces 76, 77 passing through the open end of the rigid body member 72. Top surface sections are sized to fit within member 72 such as shown in FIG. 4 with surfaces 76, 77 adjacent internal surfaces of member 72. In other words, as waste material and other debris build up on surfaces 76, 77 and decreases efficiency, insert wear strip 74 may be easily removed at any time from member 72 by simply sliding wear strip 74 longitudinally out of member 72, rotating wear strip 74 by 180° about its longitudinal axis as shown in FIG. 4, with the top surface section which had previously been enclosed within member 72 then being positioned to contact the underside of belt 46. As the top surface section which previously had been in contact with belt 46 is inserted within member 72, surfaces 76, 77 pass in close proximity to the edges and internal surfaces of member 72. This close fit results from the wear strip being sized with respect to member 72 such that front surface 77 is adjacent to or contact inside surface 81. As can be understood, providing two such top surface sections enables wear strips 74 to be more efficiently utilized and more easily and quickly replaced without disposing of the entire wear strip after some initial wear. For the purposes of this disclosure, such a reversible embodiment of wear strip 74 as shown in FIG. 4, for example, which provides that both top and bottom portions of the wear strip may be utilized as a top surface section is defined by the term "double-sided wear strip."

Figure 5A:
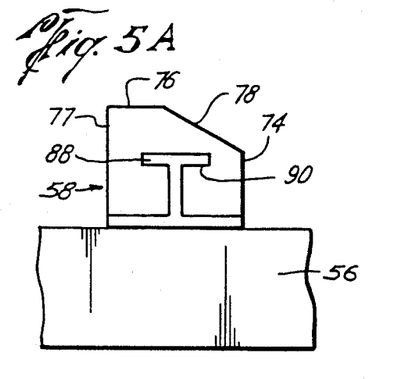
FIGS. 5A-5D are partial cross sectional views of alternative embodiments of the wear support member of the present invention.

Alternative embodiments of wear support member 56 is shown in FIGS. 5A–5D. As can be understood by one skilled in the art, the specific cross section of the insert wear strip 74 may vary depending upon the particular effects desired by such wear strip or the economics involved in the fabrication of particular devices. For example, the embodiment shown in FIG. 5A is a wear support member 58 which includes a rigid body member 72 having a T-shaped cross-section which enables the insert wear strip 74 to be slidably and removably mounted to rigid body 72 through the use of an internal "T" shaped tabs 88 which slidably receive insert wear strip 74 by means of an internal slot 90 as shown in FIG. 5A. As can be understood by one skilled in the art, again insert wear strip 74 may take many shapes. The shape disclosed in FIG. 5A is a simplified version of the embodiment shown in FIG. 4 but does not provide for a double-sided wear strip but rather provides only a single top surface section comprising top surface 76 and front surface 77 again forming an edge which removes liquid from surface 46. The embodiment of FIG. 5A further includes trailing surface 78 similar to the surface shown in FIG. 4. As also can be understood, "T" shaped tabs 88 may be replaced with other various shaped retaining means such as a rigid "V" shaped tongue to be received in a mating groove formed in insert 74.

Figure 5B:
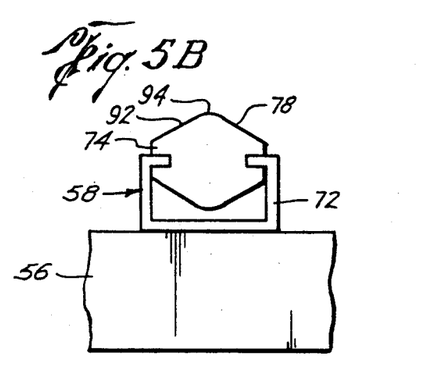

Turning now to FIG. 5B, a third embodiment of the wear support member 58 is shown. This particular embodiment discloses the use of rigid support member 72 similar to the open channel type member shown in FIG. 4. However, insert wear strip 74 shown in FIG. 5B is a double-sided wear strip in which front surface 77 is replaced with an inclined front surface 92 and arcuate surface 94 whereby surface 94 and adjoining areas contact surface 46 to remove fluid. Trailing surface 78 is provided in the embodiment shown in FIG. 5B. As can be seen in FIG. 5B, the embodiment shown therein discloses the use of a second top surface section similarly shaped as the upper surface section thereby enabling a quick and easy replacement of the initially worn top surface section by removing insert wear strip 74, rotating 180° such that the section previously housed within rigid body 72 now contacts belt 16.

As can be understood, a double-sided insert strip 74 may be provided which uses a particular shape for one top section yet an entirely different shaped top section for its second top section. For example, an insert strip 74 could use the top section shown in FIG. 4 with the second top section of FIG. 5B.

Figure 5C:
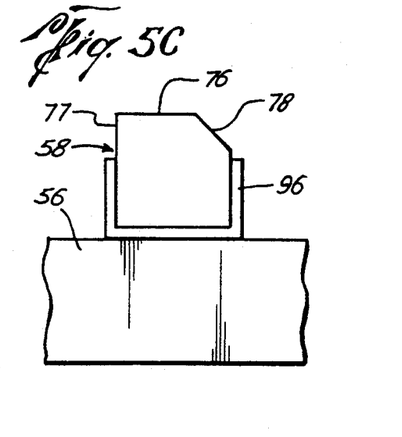

Referring now to FIG. 5C, another embodiment of the wear support member 58 is disclosed. In this embodiment, rigid body member takes the form of an open channel rigid body member 96 and insert wear strip 58 takes the form of a simplified version of a wear strip shown in FIG. 4. In particular, rigid body 96 is shown as being attached to rail 56 and simply provides an open channel without any tabs. Accordingly, insert wear strip 98 is a simplified version which provides only a front surface 77 and top surface 76 which functions similarly as previously described. Trailing surface 78 is also provided.

Figure 5D:
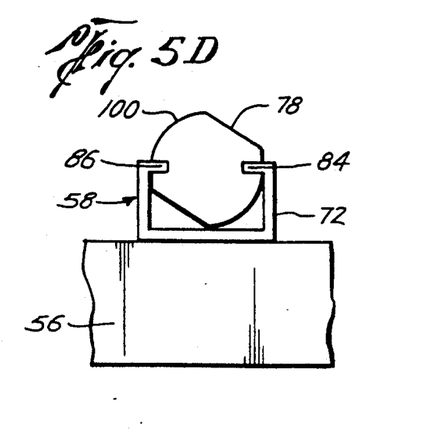

Turning now to FIG. 5D, another alternative embodiment to wear support 58 is shown. Again, rigid body member 72 is shown in the form quite similar to the embodiment in FIG. 4 and includes a pair of tabs 84, 86. However, in the embodiment shown in FIG. 5D, front surface 77 and top surface 76 of the embodiment of FIG. 4 is replaced with a single arcuate surface 100 which is adapted to engage underneath surface 46 and remove liquid as previously described. Trailing surface 78 is provided in embodiment shown in FIG. 5D and functions as previously described. As can be understood, trailing surface 78 may be omitted and the entire top surface section of the embodiment shown in FIG. 5D may be arcuate in nature thereby forming an essentially hemispherical cross sectioned surface running the length of the wear strip 74. Moreover, as shown in FIG. 5D, the embodiment of wear strip 74 shown therein may be a double-sided wear strip since it provides for a second top surface section which may be used to replace the upper surface section after it has become worn through use.

Support member 58 may be manufactured from any suitable materials. For example, rigid body member 72 may be made from any suitable metal such as aluminum or steel. Insert wear strip 74 may be machined or extruded from wear resistant material such as a hard plastic, reinforced rubber or ultra-high-molecular-weight polyethylene (UHMW).

As can be understood from the prior disclosure, the subject invention calls for a device which includes a wear support member which may have several embodiments. However, all such embodiments call for the use of an insert wear strip which may be releasably mounted, as for example, slidably mounted, on a rigid body member. The rigid body member is connected to the device such as, for example, to rail 22 or frame rails 56 and are retained there during operation. It is contemplated that the insert wear strip 74 may be easily and quickly removed from rigid body 72 and replaced after being worn during normal operation. The insert wear strip may be double-sided so as to provide the original as well as a replacement wear surface on a single wear strip which enables a more efficient and inexpensive use of such insert wear strips.

As also can be understood, the present invention contemplates that the insert wear strip may be easily and quickly mounted on the rigid body member through any of several means such as slot and tab combinations all of which can be appreciated by one skilled in the art with the benefit of the subject disclosure.

So that the manner in which the above recited features and advantages of the present invention, as well as others, which will become apparent, are obtained and can be understood in detail, a more particular description of the invention, briefly summarized above, may be had by a reference to the embodiments thereof which are illustrated in the appended drawings, which drawings form a part of this specification.

It is to be noted, however, that the appended drawings illustrate only a typical embodiments of the invention and are therefor not to be considered limiting in scope, for the invention may admit of other equally effective embodiments.

Further modifications and alternative embodiments of the apparatus of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size, and arrangement of parts. For example, equivalent elements or materials may be substituted for those illustrated and described herein. Parts may be reversed and features of the invention may be utilized independently of the use of other features, all as would be apparent to one skilled in the art after having the benefit of this description of the invention.

What is claimed is:

1. A wear support bar for use in a filtering device having a perforate conveyor belt which carries a fluid containing material, said wear support bar attached to the device substantially transverse to said belt and comprising:
    a substantially rigid open channel member attached to said filtering device; and
    a double sided wear insert slidably mounted to the open channel member, said wear insert including a first top surface section; and
    a second top surface section opposed from said first top surface section, the first and second top surface sections having a front surface which passes in close proximity to at least one internal surface of the open channel member as that top surface section is slidably mounted to the channel member and the opposed top surface section contacts the belt.

2. The bar as recited in claim 1, wherein said channel includes a tab member and said wear insert includes a slot for receiving said tab member when said insert is slid onto said open channel member, said tab member and slot constructed to retain said wear insert mounted to said channel member as the conveyor belt moves transversely across.

3. The wear support bar as recited in claim 1, wherein said wear insert includes a longitudinal trailing surface inclined outwardly from said belt surface whereby additional liquid is drawn through the belt as the belt passes over the trailing surface.

4. In a device for filtering sludge having a perforate conveyor belt riding on a double sided insert wear strip to be slidably mounted to a transversely attached open channel support bar of the device, the improvement to said insert wear strip comprising:
    a first top surface section for removing liquid adhering to the underneath surface of the belt, said section having a first top surface and a first front surface; and
    a second top surface section opposed from the first top surface section and having a second top surface and a second front surface, the wear strip being sized such that one of the front surfaces passes in close proximity to at least one internal surface of the channel support bar as that top surface section is slidably inserted into the channel bar and the opposed top surface section contacts the underneath surface of the belt.

5. The wear strip of claim 4 wherein said wear strip further includes:
    a first trailing surface section adjacent the first top surface section and inclined outwardly from the underneath surface of the belt when said first top surface section contacts said belt.

6. The wear strip of claim 5 wherein said wear strip further includes:
    a second trailing surface section adjacent the second top surface section and inclined outwardly from the underneath surface of the belt when said second top surface section contacts said belt.

7. The wear strip of claim 4 wherein said wear strip further includes a pair of longitudinal mounting slots for engaging the open channel support bar when the strip is slidably mounted thereto.

8. A device for extracting liquid from sludge or like material, said device comprising:
    a frame;
    a perforate conveyor belt mounted to the frame for carrying the sludge and extracting liquid from the sludge through the belt;
    a grid support system attached to the frame and positioned so as to contact the underneath surface of at least a portion of the conveyor belt during operation, said grid support system including
        a plurality of longitudinally spaced wear support members contacting the underneath surface of said belt such that liquid adhering to said surface is removed, each of said wear support members having:

a rigid open channel member attached substantially transverse to said belt;

a double sided insert wear strip slidably mounted to the open channel member and arranged to be removed from the device without disconnecting said channel member from the device, said wear strip having a first top surface section and a second top surface section opposed from said first top surface section, the first and second top surface sections each having a front surface which passes in close proximity to at least one internal surface of the open channel member as that top surface section is slidably positioned in the channel member and the opposed top surface section contacts the underneath surface of the belt.

9. The device as recited in claim 8 further includes:
a trailing surface adjacent one of said top surface sections said trailing surface inclined away from said belt surface when said top surface section contacts said belt.

10. The device as recited in claim 8, wherein said open channel member includes a pair of tabs constructed for slidably receiving said insert wear strip.

11. The device as recited in claim 10, wherein said insert wear strip includes a pair of slots for receiving said tabs when said strip is slid onto said channel member, said tabs and slots cooperating to retain the wear strip in position on said channel member as the belt moves transversely across the wear strip.

* * * * *

UNITED STATES PATENT AND TRADEMARK OFFICE
CERTIFICATE OF CORRECTION

PATENT NO.    :    5,240,609

DATED         :    August 31, 1993

INVENTOR      :    Tony L. Langley

It is certified that error appears in the above-identified patent and that said Letters Patent is hereby corrected as shown below:

In claim 1, column 10, line 3, insert --each-- between "sections" and "having."

Signed and Sealed this

Fifth Day of April, 1994

Attest:

BRUCE LEHMAN

*Attesting Officer*          *Commissioner of Patents and Trademarks*